(12) United States Patent
Farmanyan

(10) Patent No.: US 8,590,375 B2
(45) Date of Patent: Nov. 26, 2013

(54) SELF-CALIBRATING CAPACITIVE LIQUID LEVEL SENSOR ASSEMBLY AND METHOD

(75) Inventor: Gagik Farmanyan, Plano, TX (US)

(73) Assignee: Rochester Gauges, Inc., Dallas, TX (US)

(*) Notice: Subject to any disclaimer, the term of this patent is extended or adjusted under 35 U.S.C. 154(b) by 427 days.

(21) Appl. No.: 13/053,637

(22) Filed: Mar. 22, 2011

(65) Prior Publication Data

US 2012/0240675 A1 Sep. 27, 2012

(51) Int. Cl.
*G01F 23/26* (2006.01)
(52) U.S. Cl.
USPC .......... 73/304 C; 73/1.73; 340/618; 340/620; 324/668
(58) Field of Classification Search
USPC ............... 73/1.73, 304 C; 324/665, 686–690; 340/618, 620
See application file for complete search history.

(56) References Cited

U.S. PATENT DOCUMENTS

| | | | |
|---|---|---|---|
| 3,862,571 A * | 1/1975 | Vogel | 73/304 C |
| 4,038,871 A * | 8/1977 | Edwards | 73/304 C |
| 4,235,106 A | 11/1980 | Maltby et al. | |
| 4,590,575 A | 5/1986 | Emplit | |
| 4,795,967 A | 1/1989 | Fredericks | |
| 4,806,847 A | 2/1989 | Atherton et al. | |
| 4,935,727 A * | 6/1990 | Re Fiorentin et al. | 340/618 |
| 5,042,299 A | 8/1991 | Wells | |
| 5,049,878 A | 9/1991 | Stern | |
| 5,051,921 A | 9/1991 | Paglione | |
| 5,406,843 A | 4/1995 | Hannan et al. | |
| 5,613,398 A | 3/1997 | Lawson | |
| 5,613,399 A | 3/1997 | Hannan et al. | |
| 5,626,052 A | 5/1997 | Lawson | |
| 5,635,621 A | 6/1997 | Lawson | |
| 6,016,697 A | 1/2000 | McCulloch et al. | |
| 6,125,696 A | 10/2000 | Hannan et al. | |
| 6,138,508 A | 10/2000 | Hannan et al. | |
| 6,443,006 B1 | 9/2002 | Degrave | |
| 6,490,920 B1 * | 12/2002 | Netzer | 73/304 C |
| 6,539,797 B2 | 4/2003 | Livingston et al. | |
| 6,777,956 B2 * | 8/2004 | Davis | 324/658 |
| 6,857,313 B2 * | 2/2005 | Williamson | 73/304 C |
| 7,963,164 B2 * | 6/2011 | Ross, Jr. et al. | 73/304 C |
| 8,397,525 B2 * | 3/2013 | Chauvin et al. | 62/150 |
| 2003/0000303 A1 | 1/2003 | Livingston et al. | |
| 2005/0087013 A1 * | 4/2005 | Lin | 73/304 C |
| 2005/0229700 A1 * | 10/2005 | Chai et al. | 73/304 R |
| 2008/0250857 A1 * | 10/2008 | Burdi et al. | 73/304 C |
| 2009/0133491 A1 * | 5/2009 | Lee | 73/304 C |
| 2013/0118254 A1 * | 5/2013 | Urban et al. | 73/304 C |

* cited by examiner

*Primary Examiner* — Hezron E Williams
*Assistant Examiner* — Hoang Nguyen
(74) *Attorney, Agent, or Firm* — Alvin R. Wirthlin

(57) ABSTRACT

A method of determining level of a liquid between empty and full conditions within a container includes: providing first and second elongate capacitors, each capacitor being independently capable of measuring the liquid level at least between the empty and full conditions within the container, with the second capacitor being longer than the first capacitor; determining first and second capacitance values for the first and second capacitors, respectively, based on the liquid level height; and dividing the first capacitance value by a difference between the second and first capacitance values to thereby obtain a liquid level value independent of the dielectric constant.

20 Claims, 5 Drawing Sheets

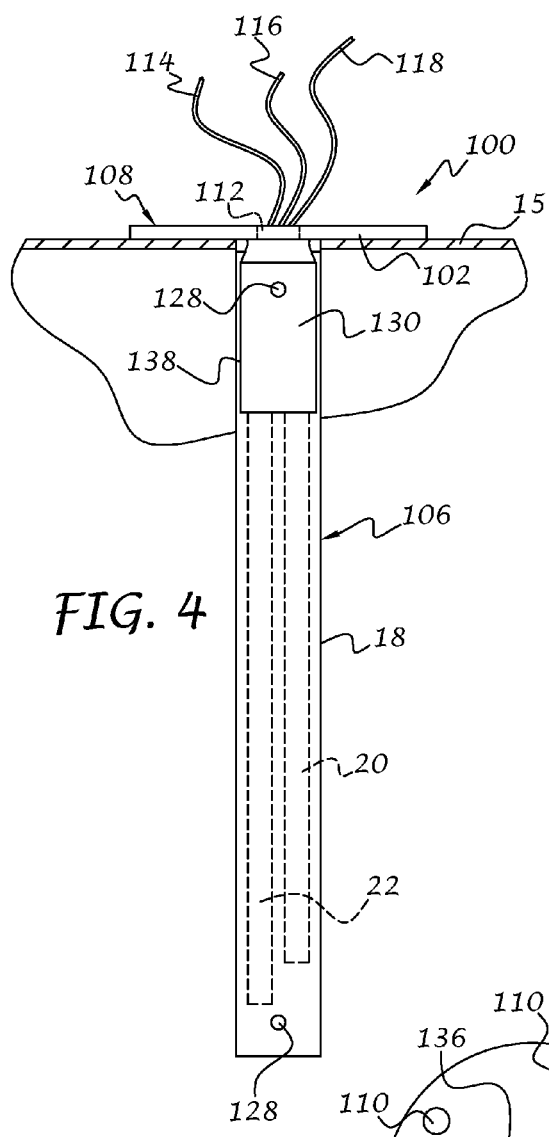
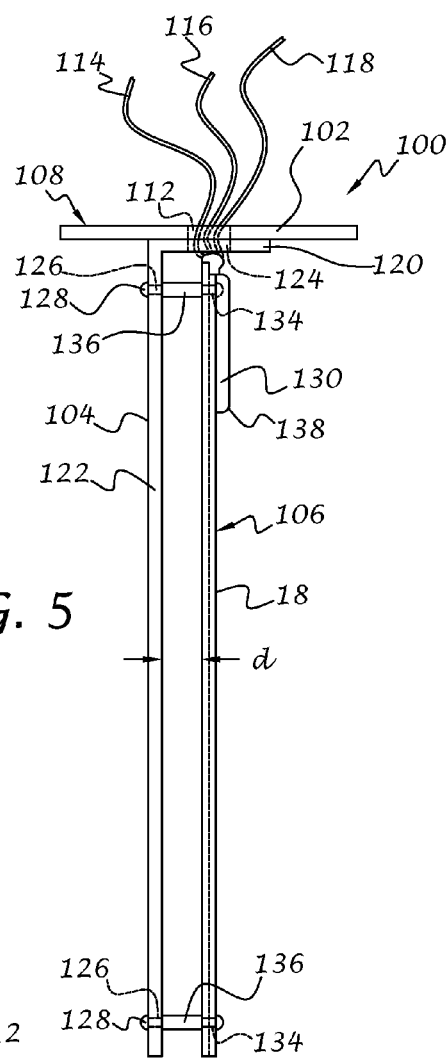
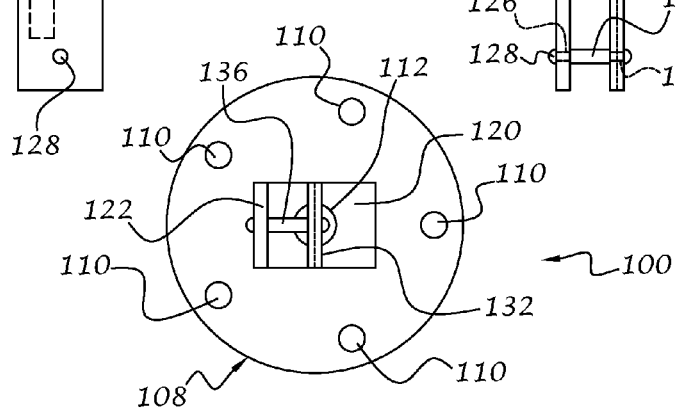

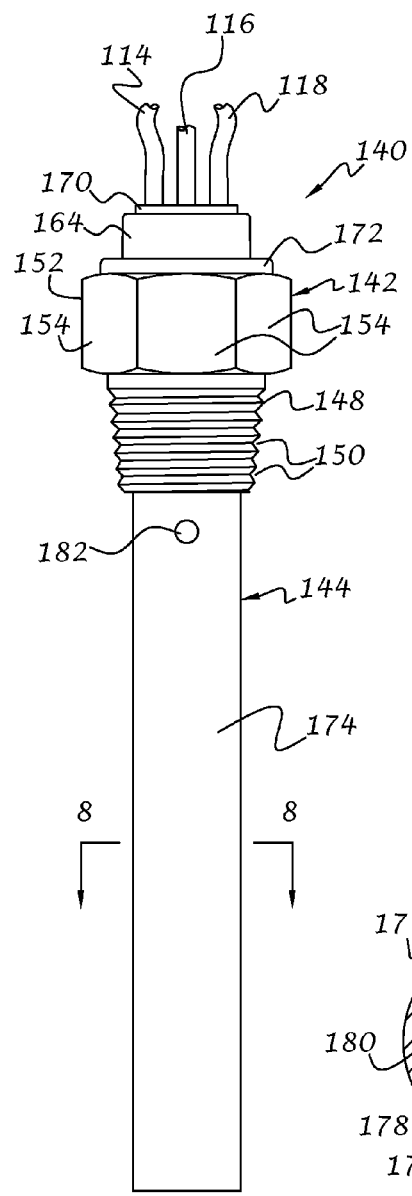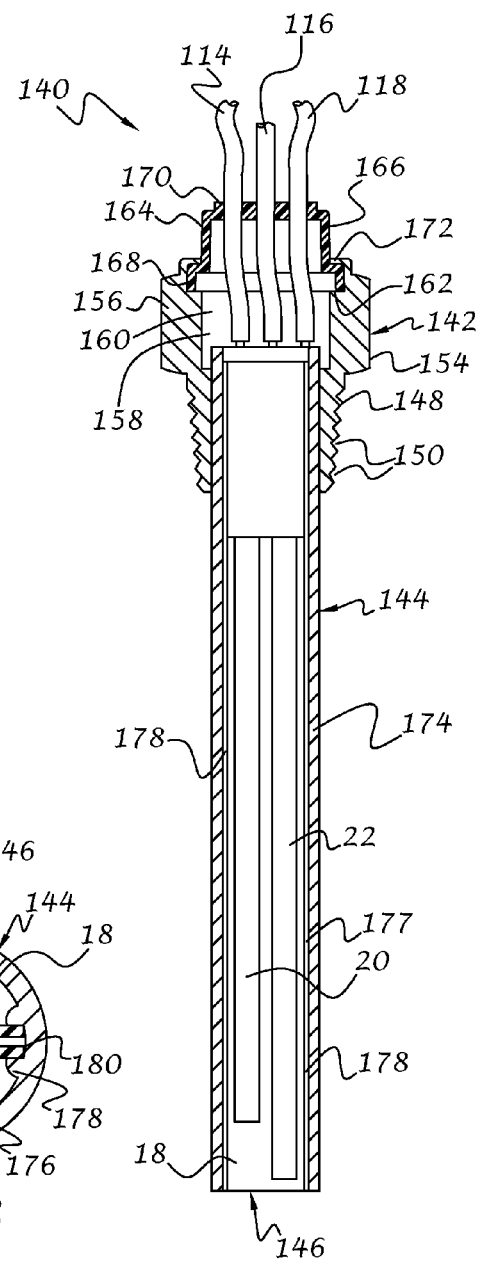
FIG. 7
FIG. 8
FIG. 9

US 8,590,375 B2

SELF-CALIBRATING CAPACITIVE LIQUID LEVEL SENSOR ASSEMBLY AND METHOD

BACKGROUND OF THE INVENTION

This invention relates to capacitive sensors, and more particularly to a self-calibrating variable capacitance sensor for determining liquid level within a tank.

Transducers for measuring liquid level are often used in vehicles, industrial equipment as well as other mobile and stationary systems and components. The electrical output of such transducers changes in response to a change in the liquid level being measured and is typically in the form of a change in resistance, capacitance, current flow, magnetic field, and frequency. These types of transducers may include variable capacitors or resistors, optical components, Hall Effect sensors, strain gauges, ultrasonic devices, and so on.

By way of example, prior art liquid level sensors, such as fuel sensors for motor vehicles, usually include a float that rides on an upper surface of the fuel in a fuel tank. The float is typically connected to one end of a pivot arm while the other end of the pivot arm typically includes a wiper mechanism that brushes against a resistor strip when the arm is rotated due to a change in fuel level in the tank. Such sensors are prone to wear, mechanical and/or electrical breakdown or inaccurate liquid level detection. Although variable capacitance probes have been developed to overcome these drawbacks, they are cost-prohibitive in many applications and are typically limited to measuring a certain type of liquid, since different liquids will have different dielectric properties.

A variable capacitance probe designed to measure fuel level normally cannot be used for measuring water level due to the different dielectric properties associated with different liquids. For example, the dielectric constant at room temperature of a vacuum is one, of air is close to one, of gasoline is about two, of industrial alcohol is anywhere from 16-31, and of water is about 80. Since capacitance is directly dependent on the dielectric constant, a transducer designed for measuring the level of one type of liquid could not be relied upon for measuring other types of liquids. However, even when the transducer is designed for measuring only one type of liquid, such as gasoline, the dielectric constant can change due to different gasoline formulations, the presence of water, alcohol, detergents, additives, as well as environmental factors such as temperature, pressure and humidity, thus leading to significant measurement inaccuracies.

In order to overcome these challenges, the prior art has suggested compensation means in the form of a reference capacitor at the bottom of the tank, which must always be immersed in the liquid being measured. The reference capacitor includes a pair of spaced plates that are independent of the measurement capacitor and the liquid being measured serves as the dielectric between the plates. A dielectric constant of the liquid can then be determined and used to offset the capacitance of the liquid level sensor to compensate for dielectric variations. However, this type of solution only takes into account changes in dielectric at the bottom of the tank since it is assumed that the liquid is uniform throughout it's volume. In reality, since some liquids have a greater density than others, there may be a separation of fluids at different depths that cannot be discerned by a single reference capacitor. For example, the reference capacitor may be exposed to water or other contaminants at the bottom of a fuel tank which may lead to inaccurate dielectric compensation and thus inaccurate fuel level readings.

In addition, the electronics associated with capacitive measurement and compensation are relatively expensive and are thus priced out of markets where there is a long-felt need for low-cost yet highly accurate liquid level transducers and other sensors for measuring liquid level.

BRIEF SUMMARY OF THE INVENTION

According to one aspect of the invention, a method of determining level of a liquid between empty and full conditions within a container includes: providing first and second elongate capacitors, each capacitor being independently capable of measuring the liquid level at least between the empty and full conditions within the container, with the second capacitor being longer than the first capacitor; determining first and second capacitance values for the first and second capacitors, respectively, based on the liquid level height; and dividing the first capacitance value by a difference between the second and first capacitance values to thereby obtain a first liquid level value independent of the dielectric constant.

According to a further aspect of the invention, a method of determining level of a liquid between empty and full conditions within a container comprising: providing first and second elongate capacitors, each capacitor being independently capable of measuring the liquid level at least between the empty and full conditions within the container, the first capacitor having a length L1 and the second capacitor having a length L2 longer than the first capacitor; dividing the first and second capacitors into a plurality of equal segments, with the second capacitor having one more segment than the first capacitor; assigning coefficient values as follows:

$$K = \frac{\Delta L}{L1};$$

$$K_0 = \frac{L0}{L1};$$

$$K_{100} = \frac{L100}{L1}$$

where $\Delta L$ is the difference in length between L2 and L1 and L100 is the length of the first capacitor between a lower end thereof and a predetermined full tank condition with L100 being less than L1; determining first and second capacitance values for the first capacitor C1 and the second capacitor C2, respectively, as follows:

$$C1_d = C1_m - C1_a$$

$$C2_d = C2_m - C2_a$$

where $C1_d$ is the determined capacitance of the first capacitor C1 and $C2_d$ is the determined capacitance of the second capacitor C2; determining an empty condition of the container when the first capacitance value $C1_d$ is approximately equal to zero; if the first capacitance value is not approximately equal to zero then determining a difference between the capacitances $\Delta C_d$ as follows:

$$\Delta C_d = C2_d - C1_d$$

determining an empty condition of the container when $\Delta C_d$ is less than unity; and if $\Delta C_d$ is not less than unity then determining a liquid level value $L_x$ of the container as follows:

$$L_x = \frac{K \times \frac{C1_m - C1_a}{C2_m - C2_a - (C1_a - C1_a)} - K_0}{K_{100} - K_0}$$

then utilizing the liquid level value $L_x$ to display and/or control the level of liquid in the container.

In accordance with yet another aspect of the invention, a capacitive sensor assembly for determining level of a liquid between empty and full conditions within a container comprises an electronics section for receiving and processing signals related to capacitance measurements for determining the liquid level within the container and a capacitive probe section connected to the electronics section. The probe section includes first and second elongate measurement capacitors. The first measurement capacitor has a first elongate conductive plate with a first length that extends from a position below the empty condition to a position above the full condition. The measurement capacitor has a second elongate conductive plate with a second length that extends from a position below the first elongate capacitor to a position above the full condition such that the second length is greater than the first length. At least a third elongate conductive plate is spaced from the first and second plates a predetermined distance to thereby form a gap therebetween for receiving the liquid to be measured. In this manner, variations of liquid height within the gap causes variations in capacitance values of the first and second measurement capacitors to thereby determine the liquid level within the container.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 4 is a front elevational view of a capacitive liquid level sensor assembly in accordance with another embodiment of the invention for mounting to a tank;

FIG. 5 is a side elevational view of the sensor assembly of FIG. 4;

FIG. 6 is a bottom plan view of the sensor assembly of FIG. 4;

FIG. 7 is a front elevational view of a capacitive sensor assembly in accordance with another embodiment of the invention;

FIG. 8 is an enlarged sectional view of the sensor assembly taken along line 8-8 of FIG. 7; and FIG. 9 is a longitudinal sectional view of the sensor assembly of FIG. 7;

It is noted that the drawings are intended to depict only exemplary embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
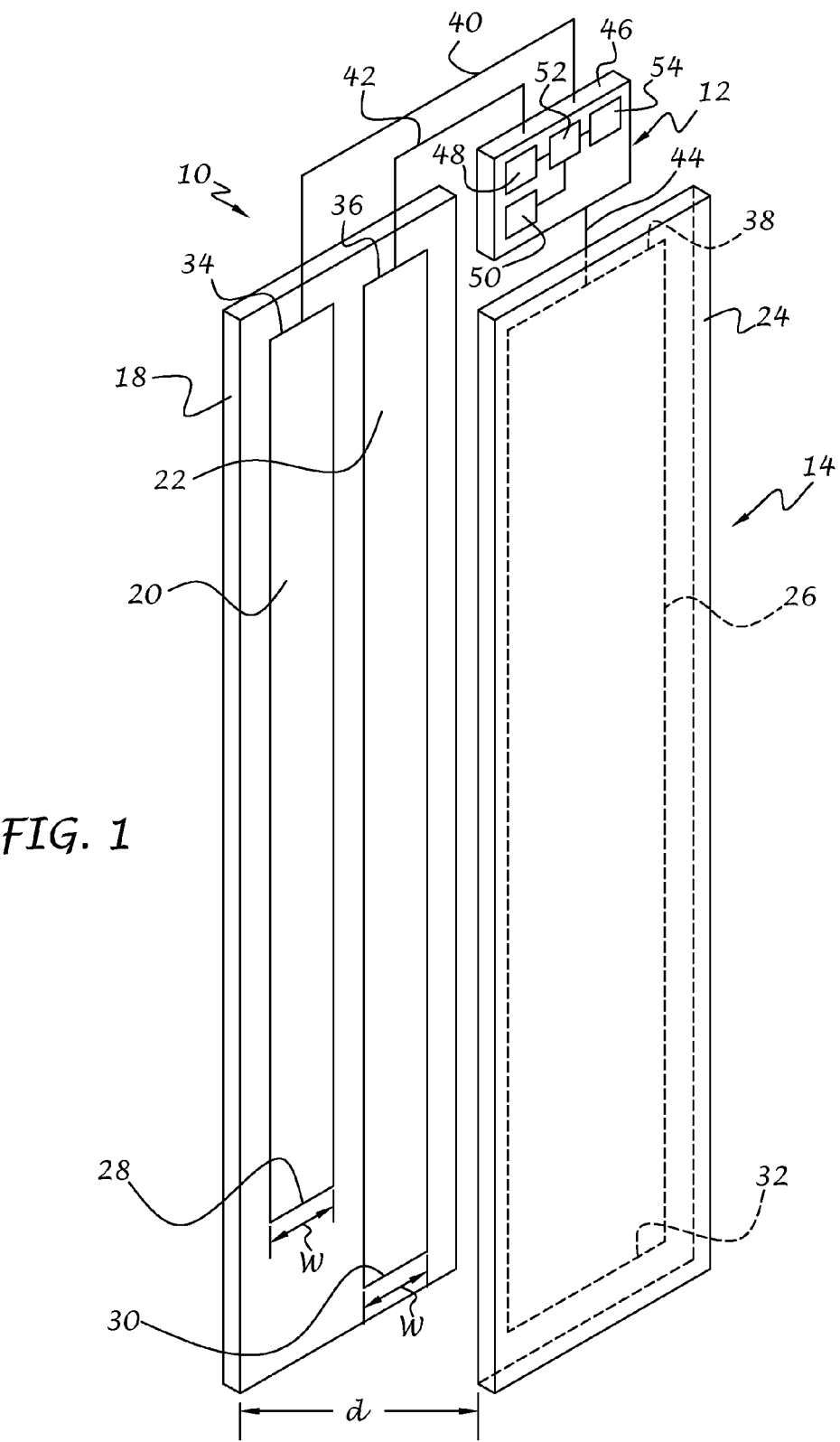
FIG. 1 is a schematic orthogonal view illustrating a capacitive transducer in accordance with the present invention.

Referring to the drawings, and to FIG. 1 in particular, a capacitive transducer 10 in accordance with an exemplary embodiment of the present invention is illustrated. The capacitive transducer 10 preferably includes an electronics section 12 and a probe section 14 that electrically interfaces with the electronics section. The probe section 14 is adapted for mounting inside a tank 15 (FIG. 4), vessel or other container for measuring liquid level within the container. The electronics section 12 is preferably powered by an external power supply (not shown) and sends appropriate signals to an external display or other interface, such as control circuitry for controlling inflow and outflow of liquid or other material upon determination of the level of fluent material within the container. It will be understood that the term "liquid" as used herein not only refers to the liquid state of various chemicals or materials, but more generally refers to any fluent material to be measured that may be in the form of liquid or granular materials. Practical applications of this invention include, but are not limited to, the measurement of water, fuel, oil, coolant, and other liquid levels within tanks or containers of motorized vehicles and stationary equipment and systems, the measurement of granular materials within storage bins, and so on.

The probe section 14 in accordance with an exemplary embodiment of the invention preferably includes a first substrate 18 and a second substrate 24 separated from the first substrate 18 by a gap denoted by distance "d." A first elongate plate 20 and second elongate plate 22 are associated with the first substrate 18. A third plate 26 (shown in hidden line) is associated with the second substrate 24. The third plate 26 is preferably common to the first and second plates 20, 22 to form two independent capacitors when fluid, such as gaseous material or liquid, is present in the gap between the first and third plates and the second and third plates.

The first and second plates 20, 22 are preferably formed as conductive areas on the substrate 18 which in turn is preferably constructed of an insulating material. Likewise, the third plate 26 is preferably formed as a conductive area on the second substrate 24 which in turn is also constructed of an insulating material. Depending on the type of sensing application, one or both substrates may comprise a stiff or flexible printed circuit board (PCB) and the plates 20, 22 and/or 26 may be formed on the surface of the PCB or between layers of the PCB using well-known manufacturing techniques.

Each plate 20, 22 and 26 has a distal end portion 28, 30 and 32, respectively, and a respective proximal end portion 34, 36 and 38. The first, second and third plates are preferably electrically connected to the electronics section 12 via respective conductive traces or wires 40, 42 and 44 for determining liquid level based on a new and improved method in accordance with the present invention, as will be described in greater detail below. The first plate 20 is preferably shorter than the second plate 22 such that the distal end portion 30 of the second plate extends lower into the tank than the distal end portion 28 of the first plate 20. In this manner, at least a portion of the second plate is constantly immersed in the liquid being measured in the tank. The third plate 24 is preferably similar in length to the second plate 22 so that at least a portion of the third plate is constantly immersed in the liquid being measured. The first and second plates 20, 22 are of preferably the same width W. However, it will be understood that the first and second plates can be of dissimilar widths without departing from the spirit and scope of the invention. It will be further understood that the provision of two plates 20, 22 on the substrate 18 is by way of example only since more plates may be provided.

It will be understood that the configuration shown in FIG. 1 is by way of example only and is not to be considered limiting. For example, the plates can be constructed in a wide variety of different shapes and/or conductive materials, and may or may not be associated with an insulative substrate, without departing from the spirit and scope of the present invention.

When the material to be measured is unknown, or when a know material undergoes unknown or unanticipated property changes, the provision of two or more elongate plates 20, 22 is a vast improvement over prior art solutions. For example, before the construction and measurement method of the present invention, it was very difficult for prior art capacitive transducers having a lower calibration capacitor and an elongate measurement capacitor to anticipate the type of fuel that would be in the tank because of variations in dielectric constant and density which are affected by temperature, humidity, pressure, fuel formulations, additives, octane levels from different manufacturers, and fluid separation (such as with fuel and water), and so on. In addition, variables introduced by the operator, such as added substances to the fuel tank in an attempt to increase fuel economy, boost octane level, and/or reduce the presence of moisture within the tank, also contributed to fuel level inaccuracies by prior art capacitive sensors. Similar uncertainties may also be encountered when measuring the coolant level, oil level, as well as other fluid levels of a motor vehicle, stationary equipment and other systems and components where the measurement of liquid level is desirous.

Referring again to FIG. 1, the electronics section 12 preferably includes a PCB 46 with a signal conditioning module 48 connected to the plates 20, 22 and 24 of the probe section 14, a power conditioning module 50 that interfaces between a power supply (not shown) and the electronics section, a processor 52 that interfaces between the signal conditioning module 48 and a display (not shown) or other device for controlling fluid supply to and/or from the tank, and a memory module 54 connected to the processor 52 for storing software program instructions and/or data. The memory module 54 may be integrated with the processor and/or be provided as a separate unit as is well known.

The power conditioning module 50 can include various electronic components (not shown) in a well-known manner to regulate power from the power supply (not shown) and meet requirements of original equipment manufacturers (OEM's) to filter noise, spikes and other electrical anomalies that may negatively affect operation of the electronics section 12. It will be understood that the power conditioning module can be eliminated and/or replaced with appropriate electronics depending on the particular measurement application.

The signal conditioning module 48 can include electrical components (not shown) for interfacing with a display (not shown) in a well-known manner and/or control circuitry for operating a pump, alarm, and so on. The signal conditioning module is of well-known construction and therefore will not be further described. Depending on the type of liquid level measurement application, the signal conditioning module can also be eliminated.

Each plate 20, 22 preferably functions as one side of a capacitor plate of a relaxation oscillator which has a fixed physical area. The third plate 24 preferably functions as the other side of the capacitor plate and the liquid or other fluent material located within the gap between the first and second substrates 18, 24 functions as the dielectric. As the fluent material travels up the probe, the areas of the plates 20, 22 and 24 covered by the fluent material increase proportionally. In turn, the value of the capacitance or the oscillator changes which can be quantified by reading the resulting changes in the frequency of the relaxation oscillator. The varying frequency is converted to increasing or decreasing counts depending on the fluid rising or falling along the length of the plates. By analyzing these counts in the processor 52, the particular capacitive state of the first capacitor (as defined by the first and third plates) and the second capacitor (as defined by the second and third plates) and thus the material level, can be accurately determined in accordance with the present invention.

Figure 2:
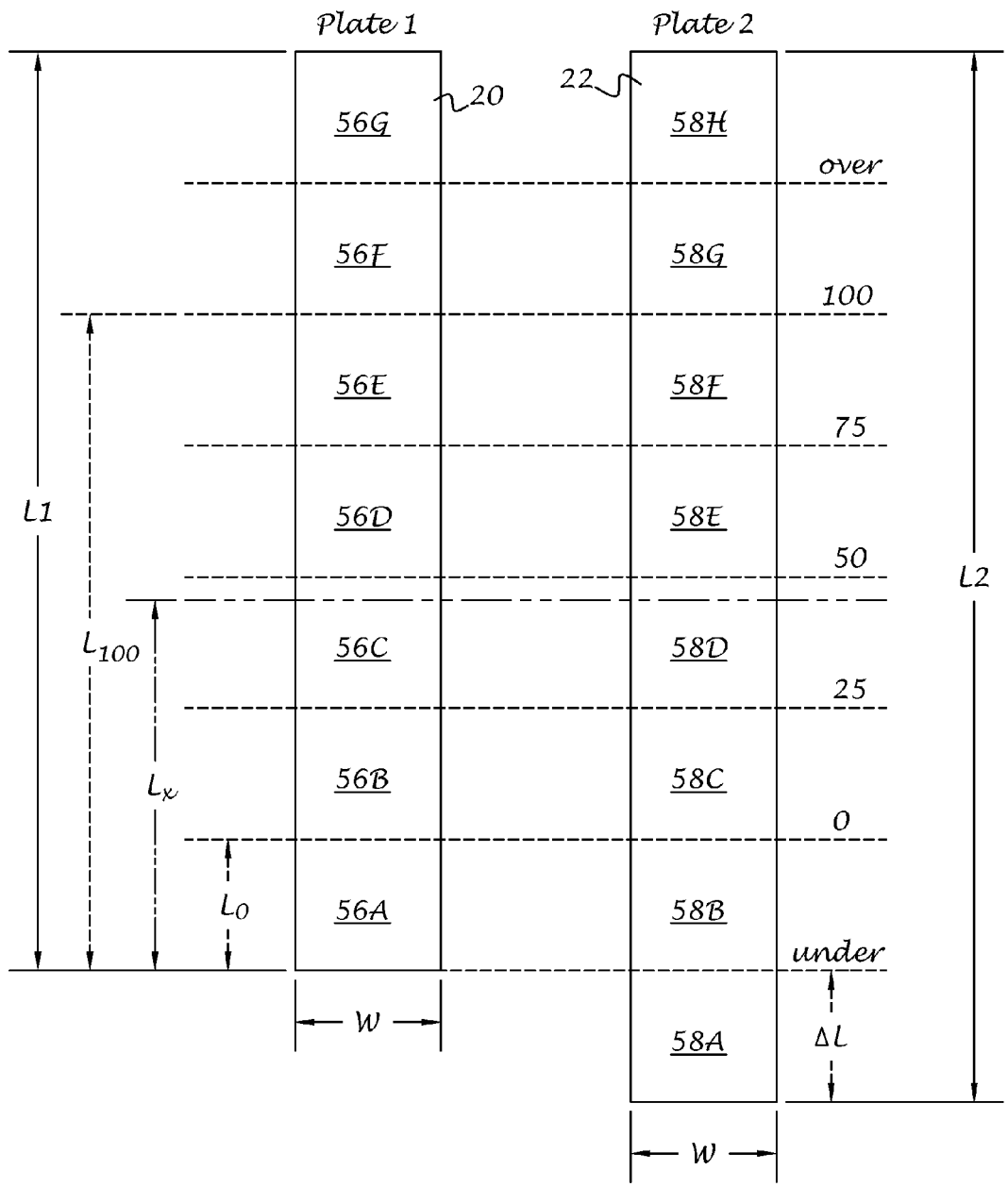
FIG. 2 is a schematic view of a portion of the capacitive transducer of FIG. 1.
Figure 3:
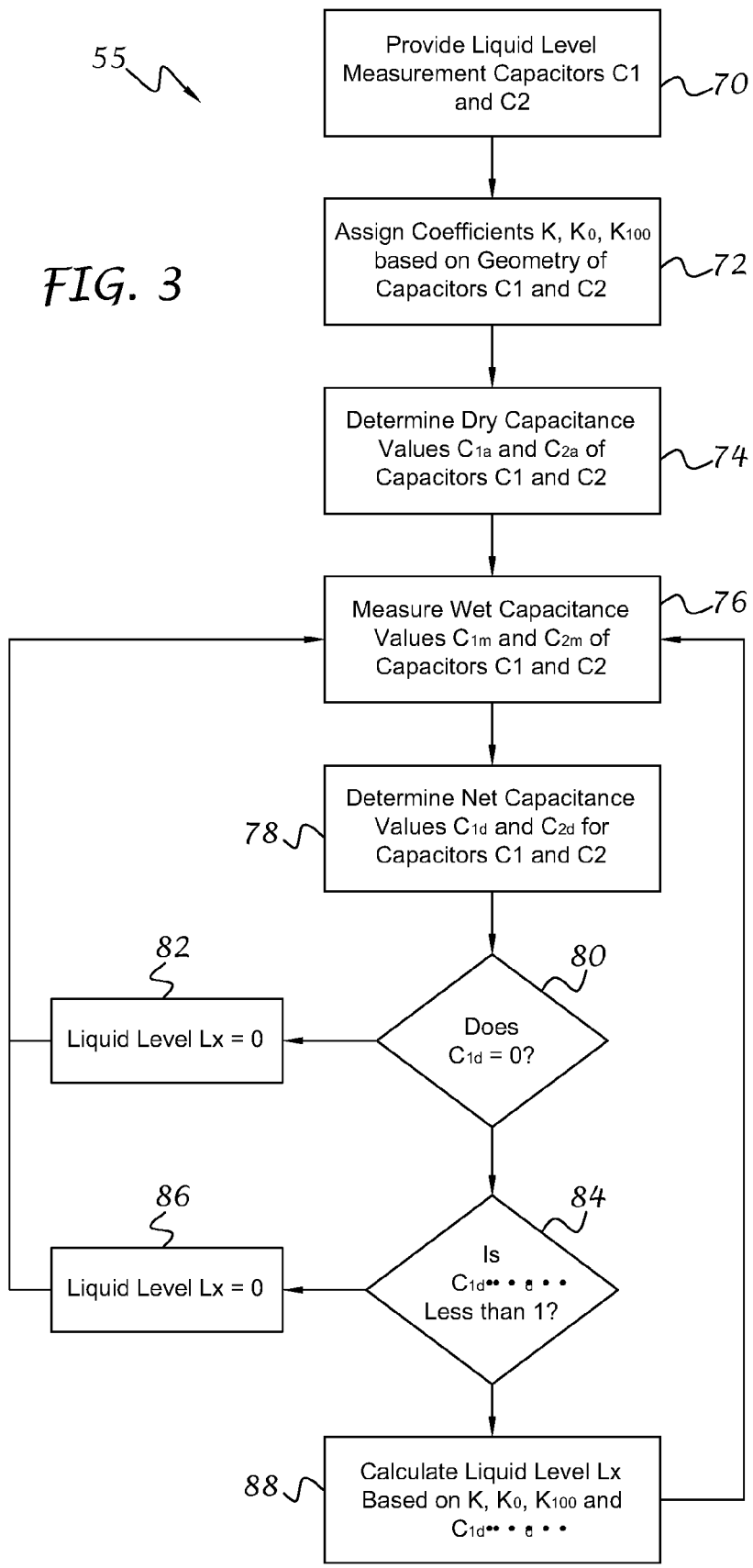
FIG. 3 is a block flow diagram illustrating a method of determining liquid level in accordance with the present invention.

A method 55 for measuring liquid level in accordance with the present invention will now be described in conjunction with the schematic view of the capacitive transducer 10 as shown in FIG. 2 and the block flow diagram as shown in FIG. 3. For the purpose of determining liquid level, first and second measurement capacitors C1 and C2, as shown at block 70 (FIG. 3), are formed: the first capacitor C1 between the first plate 20 and the common plate 26 (FIG. 1); and the second capacitor C2 between the second plate 22 and the common plate 26. The common plate 26 can be connected to electrical ground in some applications or can be a stand-alone plate.

The first plate 20 is preferably divided into a number of imaginary segments for calculating liquid level. In accordance with an exemplary embodiment of the invention, seven imaginary equal segments 56A-56G (FIG. 2) are provided. The first segment 56A represents an area on the first plate 20 below what would be considered an "empty" condition of the tank and is denoted by the height designation $L_0$. Likewise, the second segment 56B represents an area between "empty" or 0% and 25% of liquid level in the tank; the third segment 56C represents an area between 25% and 50% liquid level; the fourth segment 56D represents an area between 50% and 75% liquid level; the fifth segment 56E represents an area between 75% and 100% liquid level; the sixth segment 56F represents an area between 100% liquid level in the tank; and the seventh segment 56G represents an area above the overfill condition which is also used in calculating liquid level. The seventh segment 56G would most likely be in a dry state at any liquid level height in the tank, but may also be covered by the liquid being measured. The section of the substrate 18 (FIG. 1) corresponding to this area can also or alternatively be used for mounting components of the electronics section 12, electrical connectors, mounting hardware, and so on.

Likewise, the second plate 22 is preferably divided into a number of imaginary segments for calculating liquid level. Preferably, the number of segments is one greater than the number of segments of the first plate 20. In this manner, the second plate 22 serves as both a reference capacitor and a measurement capacitor to ensure that the dielectric constant or changes in dielectric constant are substantially the same along the length of the first and second plates for a given liquid level height $L_x$. The longer second plate 22 also ensures that liquid level calculation, as will be described in greater detail below, will always generate a greater capacitance value than the first plate 20. In accordance with an exemplary embodiment of the invention, eight imaginary equal segments 58A-58H are provided. Preferably, all of the segments 56A-56G and 58A-58H are of equal area. The first segment 58A represents an area below the "under" level and is denoted by the height designation $\Delta L$. The second segment 58B corresponds to the first segment 56A and represents an area on the second plate 22 between the "under" designation and 0% full or "empty" condition of the tank, and is also represented by the height designation $L_0$. Likewise, the third segment 58C corresponds to the second segment 56B and represents an area on the second plate 22 between "empty" or 0% and 25% of liquid level in the tank; the fourth segment 58D corresponds to the third segment 56C and represents an area between 25% and 50% liquid level; the fifth segment 58E corresponds to the fourth segment 56D and represents an area between 50% and 75% liquid level; the sixth segment 58F corresponds to the fifth segment 56E and represents an area between 75% and 100% liquid level on the second plate 22; the seventh segment 58G corresponds to the sixth segment 56F and represents an area on the second plate 22 between 100% liquid level in the tank; and the eight segment 58H corresponds to the seventh segment 56G and represents an area above the overfill condition.

Although the first plate is shown divided into seven segments and the second plate is shown divided into eight segments with each segment being of equal height and width to facilitate liquid level calculation or at least the description thereof, it will be understood that more or less segments and/or designated areas with the same or different heights and/or widths can be used without departing from the spirit and scope of the present invention.

The method 55 for determining liquid level is preferably embodied as a software program in the memory module 54 (FIG. 1) for providing various instructions to the processor 84 for determining a liquid level condition based on the measured capacitance of the plates 20 and 22 in conjunction with the third plate 26 and the geometry of the first and second plates.

Since capacitance is directly proportional to the area of the plates and the dielectric constant of the media between the plates, capacitance can be calculated by the following formula:

$$C_x = \in_0 A_x / d \quad \text{(Eq. 1)}$$

where $\in_0$ is the dielectric constant, d is the distance between the plate 20 and the common plate 26 as well as the distance between the second plate 22 and the common plate 26, and $A_x$ is the area of the plates covered by the liquid being measured for each capacitor and is determined by:

$$A_x = L_x \times W \quad \text{(Eq. 2)}$$

Where $L_x$ is the length of each plate covered by the liquid, i.e. the liquid level 60 (as represented by phantom line in FIG. 2) and W is the width of each plate 20 and 22. Since two plates 20, 22 of the same width are provided in the exemplary embodiment together with the third plate 26 which is common to the first and second plates and separated by a gap d, the capacitance of each of the first and second plates 20, 22 can be calculated, assuming that the capacitance of the first and second plates are proportional to their respective lengths, as shown in FIG. 2.

In accordance with a preferred embodiment of the invention, the following coefficients K, $K_0$ and $K_{100}$ are introduced, as shown at block 72 (FIG. 3) as follows:

$$K = \frac{\Delta L}{L1};$$
$$K_0 = \frac{L0}{L1};$$
$$K_{100} = \frac{L100}{L1}$$

Where $\Delta L$ is the length of segment 58A of the second plate 22 (or the different in lengths between the first and second plates), L1 is the length of the first plate 20, L0 is the length of segment 56A of the first plate, and L100 is the length of the segments 56A through 56 denoting a full tank condition, as shown in FIG. 2. In accordance with an exemplary embodiment of the invention, the following values are assigned:

$$L0 = \Delta L; L100 = 5 \times \Delta L$$

Therefore, the coefficients of the exemplary embodiment are:

$$K = \frac{1}{6};$$
$$K_0 = \frac{1}{6};$$
$$K_{100} = \frac{5}{6}$$

It will be understood that the above values and coefficients are given by way of example only and can vary greatly without departing from the spirit and scope of the invention. The following ratios can now be calculated:

$$\frac{L0}{\Delta L} = \frac{K_0}{K};$$
$$\frac{L100}{\Delta L} = \frac{K_{100}}{K}$$

As shown at block 74 of FIG. 3, the dry plate capacitance $C1_a$ of the first capacitor C1 and the dry plate capacitance $C2_a$ of the second capacitor C2 are determined. The dry plate capacitance is measured in air or vapor (depending on the particular measurement application) where the air or vapor functions as the dielectric when the probe section 14 is entirely out of the liquid to be measured, such as during a pre-calibration routine at the manufacturer or when it is determined that the contents of the tank are below the "under" level (FIG. 2) during use.

When partially submersed in a liquid, the plate capacitances as measured by the first and second capacitors will be $C1_7$, and $C2_m$, respectively, as shown at block 76. These values represent both plate capacitances due to a combination of liquid and air (and/or vapor) above the liquid. In order to obtain a true indication of liquid level, the net capacitance values are determined to thereby eliminate the capacitances due to the air and/or vapor as shown at block 78 and as follows:

$$C1_d = C1_m - C1_a \quad \text{(Eq. 3)}$$

$$C2_d = C2_m - C2_a \quad \text{(Eq. 4)}$$

Where $C1_d$ is the determined capacitance of the first capacitor C1 and $C2_d$ is the determined capacitance of the second capacitor C2. Since the determined capacitances of $C1_d$ and $C2_d$ are primarily created by a submersed portion of their respective plates, a linear relationship exists between the determined capacitance and the liquid level $L_x$.

If it is determined, at block 80, that the value of $C1_d$ is approximately equal to zero, it is concluded that the liquid level $L_x$ is zero at block 82, i.e. the contents of the tank are below a level where measurement can occur, such as when the liquid level of the tank is at or below the "under" level of FIG. 2, resulting in a dry capacitance measurement of the first capacitor C1. If on the other hand it has been determined that the value of $C1_d$ is greater than zero, a difference between the capacitances $\Delta C_d$ are preferably calculated as follows:

$$\Delta C_d = C2_d - C1_d = (C2_m - C2_a) - (C1_m - C1_a) \quad \text{(Eq. 5)}$$

The following ratio can then be used in a linear relationship to calculate the level of the fluid with the first capacitor C1 and second capacitor C2:

$$\frac{C1_d}{\Delta C_d} = \frac{C1_m - C1_a}{(C2_m - C2_a) - (C1_m - C1_a)} \quad \text{(Eq. 6)}$$

If it is determined that the above formula returns a value less than unity, as shown at block 84, it is concluded that the liquid level $L_x$ is zero at block 86, i.e. the contents of the tank are at or below the "0" level of FIG. 2. If however the above formula returns a value of approximately equal to one or greater, the liquid level $L_x$ is preferably determined at block 88 as follows:

$$L_x = \frac{K \times \frac{C1_m - C1_a}{C2_m - C2_a - (C1_a - C1_a)} - K_0}{K_{100} - K_0} \quad \text{(Eq. 7)}$$

Since the dielectric constant $\in_0$ is associated with both the numerator and denominator of the above equation (see Eq. 1 above), and further since both capacitors extend across the height of the measuring volume of liquid in the tank, it can be assumed that the dielectric constant $\in_0$ is the same across both the first and second capacitors C1 and C2 with a higher degree of accuracy over prior art devices. Accordingly, the dielectric constant can be eliminated from the liquid level calculation as noted from Eq. 7 above, since changes in the properties of the dielectric due to fluctuations in temperature, humidity, different liquids, and so on, affect each capacitor C1 and C2 equally. In order to simplify Eq. 7, the above-determined coefficients, in accordance with the exemplary embodiment as described above, i.e. when L0≡ΔL and L100≡5×ΔL, the coefficients are $$K = \frac{1}{6},$$

$$K_0 = \frac{1}{6};$$

and $$K_{100} = \frac{5}{6},$$

the following equation can be used to determine liquid level:

$$L_x = \frac{1}{4}\left(\frac{C1_M - C1_A}{C2_M - C2_A - (C1_M - C1_A)} - 1\right) \quad \text{(Eq. 8)}$$

From Eq. 8 above, it is possible to determine the liquid level with a low-cost processor performing simple arithmetic functions without knowing the dielectric constant simply by measuring the capacitances of the two capacitors C1 and C2 before and after immersing the probe into the liquid being measured. Once the liquid level $L_x$ has been determined either at block 82, 86 or 88 in FIG. 3, the probe 14 (FIG. 1) is continuously monitored to measure the wet capacitance values at block 76. If a recalibration routine is necessary, the method can return to block 74 to remeasure the dry capacitance of one or both capacitors C1 and C2.

Referring now to FIGS. 4-6, a capacitive liquid level sensor assembly 100 in accordance with an exemplary implementation of the above-described method of determining liquid level is illustrated. The sensor assembly 100 preferably includes a mounting head 102, an elongate support 104 extending downwardly from the mounting head, and a capacitive transducer 106 connected to the support 104.

As shown, the mounting head 102 is preferably in the form of a circular disk 108 with a central opening 112 and circumferentially spaced openings 110 that extend through a thickness of the disk. The disk may be formed of any suitable material including, without limitation, conductive or non-conductive plastic, metal, ceramic, and so on. The openings 110 are adapted to receive mounting bolts (not shown) or the like associated with a tank or reservoir 15 for securely mounting the sensor assembly 100 to the tank in a well-known manner. Electrical wires 114, 116 and 118 preferably extend through the central opening 112 for providing electrical power to the capacitive transducer 106 and sending a liquid level signal to a display or other control circuitry (not shown). For example, the wires 114 and 116 may conduct power and ground, respectively, while the wire 118 may conduct the liquid level signal.

The support 104 is preferably L-shaped in configuration with a first leg 120 secured to the mounting head 102 and a second leg 122 extending downwardly from the first leg. A central opening 124 (shown in hidden line in FIG. 5) is formed in the first leg 120 coincident with the central opening 112 of the mounting head 102 for receiving the electrical wires 114, 116 and 118. If desired, a pass-through connector, encapsulant or the like can be located in the central opening 112 to isolate the contents of the tank from the outside environment. Spaced openings 126 (shown in hidden line in FIG. 5) are formed in the second leg 122 for receiving a fastener 128 or the like in order to connect the transducer 106 to the second leg 122. The support 104 is preferably constructed of an electrically conductive material and can be directly connected to vehicle ground when the tank is associated with a vehicle or connected to a separate source of ground via the wire 116, for example, or can be a stand-alone plate.

The capacitive transducer 106 preferably includes an electronics section 130 and a probe section 132 that electrically interfaces with the electronics section. The probe section 132 is preferably constructed in a manner similar to the probe section 14 previously described, and includes the substrate 18 in the form of a printed circuit board with plates 20 and 22 that form two separate capacitors with the second leg 122 which functions as a common ground to both plates. If the support 104 is constructed of an electrically insulating material, then another printed circuit board is preferably provided, as shown in FIG. 1 to function as the common ground.

Spaced openings 134 (shown in hidden line in FIG. 5) are formed in the substrate 18 in alignment with the openings 126 of the second leg 122 for receiving the fasteners 128. Preferably, the fasteners 128 extend through standoffs or spacers 136 that are positioned between the substrate 18 and second leg 122 to create a gap d for receiving the liquid which, as described above, functions as the dielectric of the capacitors. The plates 20, 22 can be located on an inner surface of the substrate 18 or between layers of the printed circuit board. With respect to the latter modification, the printed circuit board would also function as the dielectric in conjunction with the liquid within the gap.

The electronics section 130 is preferably similar in construction to the electronics section 12, with the exception that it is mounted on the same PCB as the probe section 132. A protective cover 138, such as a plastic housing, encapsulant, or the like, isolates the electronics from the surrounding fluent material to be measured.

Referring now to FIGS. 7-9, a capacitive liquid level sensor assembly 140 in accordance with a further embodiment of the invention is illustrated. The sensor assembly 140 preferably includes a mounting head 142, an elongate support 144 extending downwardly from the mounting head, and a capacitive transducer 146 connected to the support 144. The capacitive transducer 146 is preferably similar in construction to the transducer 14 previously described.

The mounting head 142 is preferably constructed of a metal material, such as brass, but may alternatively be constructed of plastic or other material. The mounting head 142 includes a mounting section 148 with external threads 150 for engagement with internal threads of a reservoir housing (not shown), which may be in the form of a tank, vessel, container or the like. The head 142 also preferably includes a securing section 152 with generally flat, external faces 154 for engagement by a wrench or the like (not shown) for installing and removing the liquid level sensor assembly 140 with respect to the reservoir housing in a well-known manner. The particular configuration of the mounting head 142 will largely depend on the mounting arrangement of the reservoir housing. Accordingly, the external threads 150 and external faces 154 may be eliminated and other mounting means may be provided. Preferably, the securing section 152 has a wall 156 with the external faces 154 formed thereon and a generally cylindrical interior cavity 158 delimited by an interior surface 160 of the wall. An annular step 162 is formed in the interior surface 160 for supporting an end cap 164.

The end cap 164 has an annular side wall portion 166 with an enlarged wall section 168 and an upper wall 170. The enlarged wall section 168 is preferably in sealing engagement with the interior surface 160 of the wall 156. An annular flange 172 of the wall 156 can be pressed, rolled or otherwise deformed over the enlarged wall section 168 to secure the end cap 164 to the securing section 152. It will be understood that other means for holding the components together can be employed, such as adhesive, welding, heat staking, and so on. Electrical wires 114, 116 and 118 from the capacitive transducer 146 exit the mounting head 142 through openings formed in the upper wall 170. It will be further understood that the end cap 164 can be replaced with encapsulating material or any other arrangement to isolate the electronics from outside conditions.

In accordance with a further embodiment of the invention, the wires and/or end cap may be replaced with a male or female plug portion with electrical connectors (not shown) for mating with a female or male plug portion (not shown), respectively, of the vehicle or system on which the liquid level sensor assembly 140 is to be installed.

The elongate support 144 preferably includes a tubular member 174 constructed of a metal material, such as aluminum, but may alternatively be constructed of plastic or other metal, ceramic or composite materials. When the tubular member 174 is constructed of an electrically conductive material, it may function as an outer plate of the capacitive transducer 146 with the liquid or other fluent material being measured functioning as the dielectric. However, it will be understood that operation of the capacitive transducer need not depend on the tubular member 174 since, as shown in FIG. 8, the second substrate 24 and common plate 26 (FIG. 1) can be provided together with the first substrate 18 and plates 20, 22 as previously described, within the hollow interior 177 of the elongate support 144.

The tubular member 174 preferably includes a continuous wall 176 that is generally circular in cross section to form the hollow interior 177. However, it will be understood that the tubular member 174 can be of any desired cross sectional shape such as square, rectangular, oval, and so on. A pair of projections 178 extend radially into the hollow interior 177 from an inner surface 179. A channel 180 is formed in each projection 178 for receiving opposite ends of the substrates 18 and 24 of the capacitive transducer 146 so that a gap "d" is located therebetween for receiving the liquid to be measured. The tubular member 174 is preferably press-fit into the mounting head 142. However, it will be understood that the tubular member 174 and mounting head 142 can be connected together in any well-known manner including welding, adhesive bonding, clamping, fastening, and so on. A vent aperture 182 (FIG. 7) can be formed in the tubular member 174 to allow the ingress and egress of fluid with respect to the hollow interior 177 as the liquid level falls and rises in the tank or container.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

I claim:

1. A method of determining level of a liquid between empty and full conditions within a container, the liquid having a dielectric constant, the method comprising:
   providing first and second elongate capacitors, each capacitor being independently capable of measuring the liquid level at least between the empty and full conditions within the container, with the second capacitor being longer than the first capacitor;
   determining first and second capacitance values for the first and second capacitors, respectively, based on the liquid level height; and
   dividing the first capacitance value by a difference between the second and first capacitance values to thereby obtain a first liquid level value independent of the dielectric constant.

2. A method according to claim 1, and further comprising:
   assigning a first coefficient value dependent on a geometrical difference between the first and second capacitors; and
   applying the first coefficient value to the first liquid level value to obtain a second liquid level value.

3. A method according to claim 2, wherein the step of assigning at least one coefficient value comprises dividing the difference between lengths of the second and first capacitors by the length of the first capacitor.

4. A method according to claim 3, wherein the step of applying the first coefficient value comprises multiplying the first coefficient value with the first liquid level value.

5. A method according to claim 4, and further comprising:
   assigning a second coefficient value by dividing a first segment length of the first capacitor between a lower end of the first capacitor and a predetermined empty level thereof by the length of the first capacitor; and
   subtracting the second coefficient value from the second liquid level value to obtain a third liquid level value.

6. A method according to claim 5, and further comprising:
assigning a third coefficient value by dividing a second segment length of the first capacitor between the lower end of the first capacitor and a predetermined full level thereof by the length of the first capacitor; and
dividing the third liquid level value by the third coefficient value to obtain a fourth liquid level value reflective of the level of liquid in the container.

7. A method according to claim 6, wherein the first segment length is at least substantially equal to the difference between lengths of the second and first capacitors.

8. A method according to claim 5, wherein the first segment length is at least substantially equal to the difference between lengths of the second and first capacitors.

9. A method according to claim 1, wherein the step of determining first and second capacitance values includes determining a dry capacitance value for each capacitor, measuring a wet capacitance value for each capacitor; and subtracting the dry capacitance value from the wet capacitance value for each capacitor.

10. A method according to claim 9, and further comprising indicating an empty condition of the container by determining whether at least one of the first and second capacitance values is approximately equal to the dry capacitance value.

11. A method according to claim 10, and further comprising indicating an empty condition of the container when the first liquid value is less than unity.

12. A method according to claim 1, and further comprising indicating an empty condition of the container when the first liquid value is less than unity.

13. A method of determining level of a liquid between empty and full conditions within a container, the liquid having a dielectric constant, the method comprising:
providing first and second elongate capacitors, each capacitor being independently capable of measuring the liquid level at least between the empty and full conditions within the container, the first capacitor having a length L1 and the second capacitor having a length L2 longer than the first capacitor;
dividing the first and second capacitors into a plurality of equal segments, with the second capacitor having one more segment than the first capacitor;
assigning coefficient values as follows:

$$K = \frac{\Delta L}{L1};$$

$$K_0 = \frac{L0}{L1};$$

$$K_{100} = \frac{L100}{L1}$$

where $\Delta L$ is the difference in length between L2 and L1 and L100 is the length of the first capacitor between a lower end thereof and a predetermined full tank condition with L100 being less than L1;
determining first and second capacitance values for the first capacitor C1 and the second capacitor C2, respectively, as follows:

$$C1_d = C1_m - C1_a$$

$$C2_d = C2_m - C2_a$$

where $C1_d$ is the determined capacitance of the first capacitor C1 and $C2_d$ is the determined capacitance of the second capacitor C2;

determining an empty condition of the container when the first capacitance value $C1_d$ is approximately equal to a dry capacitance value;
if the first capacitance value is not approximately equal to the dry capacitance value then determining a difference between the capacitances $\Delta C_d$ as follows:

$$\Delta C_d = C2_d - C1_d$$

determining an empty condition of the container when $\Delta C_d$ is less than unity; and
if $\Delta C_d$ is not less than unity then determining a liquid level value $L_x$ of the container as follows:

$$L_x = \frac{K \times \frac{C1_m - C1_a}{C2_m - C2_a - (C1_a - C1_a)} - K_0}{K_{100} - K_0}$$

and; utilizing the liquid level value $L_x$ to display and/or control the level of liquid in the container.

14. A method according to claim 13, wherein:

$$L0 = \Delta L; \text{ and}$$

$$L100 = 5 \times \Delta L;$$

such that:

$$L_x = \frac{1}{4}\left(\frac{C1_M - C1_A}{C2_M - C2_A - (C1_M - C1_A)} - 1\right).$$

15. A capacitive sensor assembly for determining level of a liquid between empty and full conditions within a container, the capacitive sensor assembly comprising:
an electronics section for receiving and processing signals related to capacitance measurements for determining the liquid level within the container; and
a capacitive probe section connected to the electronics section comprising:
a first elongate measurement capacitor having a first elongate conductive plate with a first length that extends from a position below the empty condition to a position above the full condition;
a second elongate measurement capacitor having a second elongate conductive plate with a second length that extends from a position below the first elongate measurement capacitor to a position above the full condition, the second length being greater than the first length; and
at least a third elongate conductive plate spaced from the first and second plates a predetermined distance to thereby form a gap for receiving the liquid to be measured, the first and second plates being located in a first plane and the at least the third plate being located in a second plane separated from the first plane, the first and second planes being at least substantially parallel;
wherein first capacitance and second capacitance values are determined between the at least the third plate and the first and second plates, respectively;
wherein variations of liquid height within the gap causes variations in capacitance values of the first and second measurement capacitors to thereby determine the liquid level within the container.

16. A capacitive sensor assembly according to claim 15, wherein the first measurement capacitor comprises a first section extending from the below empty condition to the empty condition.

17. A capacitive sensor assembly according to claim 16, wherein the first section is approximately equal to a difference between the second and first lengths of the second and first measurement capacitors, respectively.

18. A capacitive sensor assembly according to claim 17, wherein the first measurement capacitor comprises a second section extending from the below empty condition to the full condition.

19. A capacitive sensor assembly according to claim 18, wherein the second section is a multiple of the first section.

20. A capacitive sensor assembly according to claim 19, wherein the first length of the first measurement capacitor is a multiple of the first section.

\* \* \* \* \*